US006419609B1

(12) United States Patent
Lechner

(10) Patent No.: US 6,419,609 B1

(45) Date of Patent: Jul. 16, 2002

(54) TORQUE ADAPTATION DEVICE FOR AN ENGINE MOMENT MODEL

(75) Inventor: Bernhard Lechner, Prien am Chiemsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/505,195

(22) Filed: Feb. 16, 2000

(30) Foreign Application Priority Data

Feb. 16, 1999 (DE) ........................................ 199 06 416

(51) Int. Cl.[7] ............................ G06F 17/00; G01L 3/24

(52) U.S. Cl. ......................... 477/110; 701/54; 73/117.3

(58) Field of Search ................................ 477/107, 110; 701/54; 73/117.3, 117.2; 123/349, 350

(56) References Cited

U.S. PATENT DOCUMENTS

| | | | | | |
|---|---|---|---|---|---|
| 4,008,567 | A | * | 2/1977 | Hirsch | 477/110 X |
| 4,724,723 | A | * | 2/1988 | Lockhart et al. | 477/110 X |
| 4,971,011 | A | * | 11/1990 | Nanyoshi et al. | 123/350 |
| 5,297,044 | A | * | 3/1994 | Sakaki et al. | 702/43 |
| 5,403,245 | A | * | 4/1995 | Watanabe et al. | 477/107 X |
| 5,709,629 | A | * | 1/1998 | Minowa et al. | 477/110 X |
| 5,785,627 | A | * | 7/1998 | Uno et al. | 477/110 X |
| 5,801,644 | A | * | 9/1998 | Ruthroff | 340/870.31 |
| 5,888,166 | A | * | 3/1999 | Minowa et al. | 477/168 |
| 5,938,712 | A | * | 8/1999 | Ibamoto et al. | 701/54 |
| 6,104,976 | A | * | 8/2000 | Nakamura | 701/54 X |
| 6,173,226 | B1 | * | 1/2001 | Yoshida et al. | 701/54 X |

FOREIGN PATENT DOCUMENTS

| | | |
|---|---|---|
| DE | 37 15 423 | 11/1987 |
| DE | 197 26 194 | 12/1998 |

* cited by examiner

*Primary Examiner*—Charles A Marmor
*Assistant Examiner*—Ha Ho
(74) *Attorney, Agent, or Firm*—Crowell & Moring LLP

(57) ABSTRACT

A torque adaptation device is provided having a computation unit which determines an engine moment with the help of an engine moment model from performance characteristics and/or sensor input parameters, such as engine temperature, load, or engine speed. In order to improve the accuracy of the engine moment determination, a sensor for capturing a moment in a drive shaft located between the combustion engine and the driven wheels is been provided. The sensor generates a signal for the computation unit which corresponds to the moment. The computation unit is constructed such that the resulting engine moment from the model can be corrected as a function of the acquired moment.

14 Claims, 1 Drawing Sheet

TORQUE ADAPTATION DEVICE FOR AN ENGINE MOMENT MODEL

BACKGROUND AND SUMMARY OF THE INVENTION

This application claims the priority of German Application No. 199 06 416.4, filed Feb. 16, 1999, the disclosure of which is expressly incorporated by reference herein.

The invention refers to a torque adaptation device for an engine moment model and, more particularly, to a device for torque adaptation, at which at least one computation unit is provided, which determines an engine moment with the help of an engine moment model from performance characteristics and/or sensor input parameters, such as engine temperature, load, or engine speed.

Engine moment models for the determination of engine moments are generally known and used in engine, transmission and chassis control units. Conventional engine moment models calculate the engine moment from inputs of performance characteristics and sensors, such as engine temperature, load and/or engine rpm.

However, what is not factored into previous models, especially as a sensor input parameter, is the output moment that exists in the drive train following a clutch disengagement.

Through a purely mathematical model computation of the engine moment it is possible that this computated engine moment may deviate from the actual engine moment by up to 20% with standard engines, due to power tolerances. However, since the engine moments in the individual transmission control units are used as input parameters for adjustment or control operations, it thus naturally also results in making the respective engine, transmission and chassis adjustments or controls inaccurate.

It is thus the object of the present invention to describe a device for torque adaptation for an engine moment model with which the engine moment can be determined accurately.

This goal is achieved by a device for torque adaptation, at which at least one computation unit is provided, which determines an engine moment with the help of an engine moment model from performance characteristics and/or sensor input parameters, such as engine temperature, load, or engine speed. This invention is characterized in that a sensor is provided to capture a moment which exists in a transmission output shaft between a clutch of the internal combustion engine and the driven wheels. The sensor generates a signal that corresponds to the moment for at least one computation unit. The computation value is developed in such a way that the engine moment which has been determined from the model can be corrected as a function of the acquired moment.

In particular, a sensor is used to determine the moment that exists in a drive shaft between a clutch and the driven wheels. The sensor is preferably mounted on the actual transmission output or cardan shaft, and it transmits the engine moment that occurs on this shaft in a contactless manner.

A signal from the sensor proportional to the captured drive moment is sent to a control unit and serves to adapt the engine moment that has been determined from the model.

The accuracy of the engine moment can be significantly increased with the aforementioned adaptation, so that deviations of only up 2% occur in static operation, and up to 5% in transient operation.

The accuracy of the determined engine moment, and thus the accuracy of the control units operated thereby is improved overall, for example, the shifting accuracy in automatic transmissions (also in semiautomatic transmissions) and the control accuracy of chassis devices, especially as they occur during a sudden brake application. As a result, vehicle safety can be improved as well. In addition, an accurate engine moment will also be of great advantage in future engine concepts, as for example in a variable valve drive or a direct fuel-injected engine.

Other objects, advantages and novel features of the present invention will become apparent from the following detailed description of the invention when considered in conjunction with the accompanying drawings.

DETAILED DESCRIPTION OF THE DRAWINGS

Figure 1:
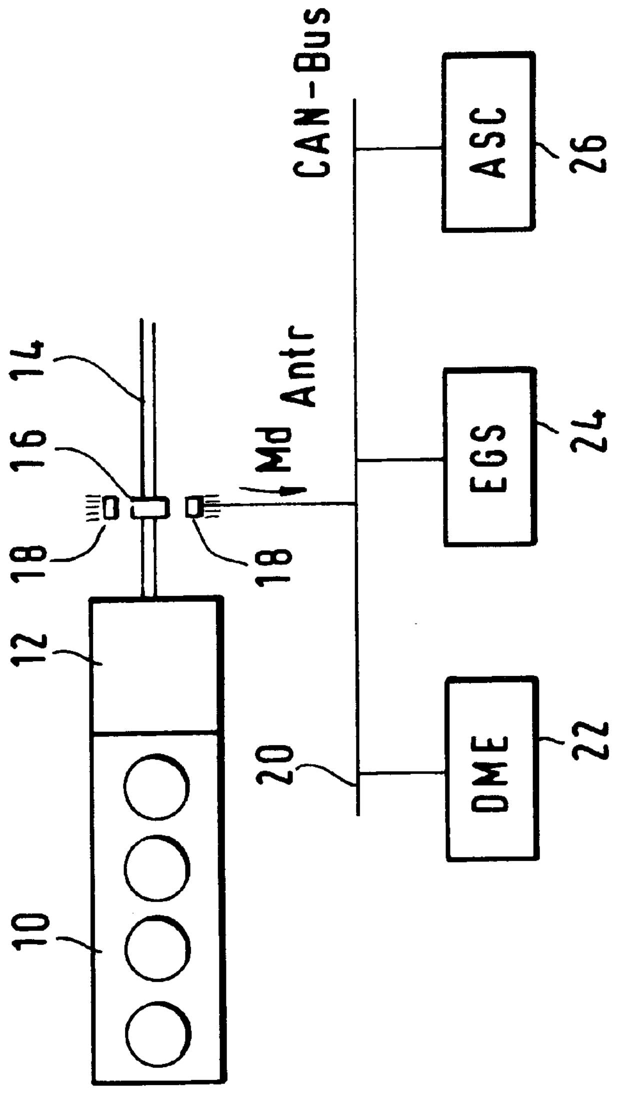
FIG. 1 is a schematic block diagram of a device according to the present invention.

FIG. 1 is a schematic block diagram of an internal combustion engine 10, to which a clutch 12 has been directly connected. This clutch has a drive shaft 14 on the output side, on which a moment logging sensor has been located with a strain gauge 16 in front. Radially across from this strain gauge 16, receivers 18 are arranged which, with zero contact, generate or receive a corresponding signal in the torsional direction, depending upon the load upon the strain gauge, and transmit it as a signal $Md_{Antr}$ to a CAN bus 20.

Several control units are coupled with the CAN bus, specifically, digital engine electronics (DME) 22, an electrical transmission controller (EGS) 24, and a traction control system (ASC) 26. The operation of these control units are well known and will therefore not be described here. The moment $Md_{Antr}$ transmitted by the sensor receiver 16/18 is recorded by all of the control units and is peripherally taken into account when determining an actual engine moment.

Figure 2:
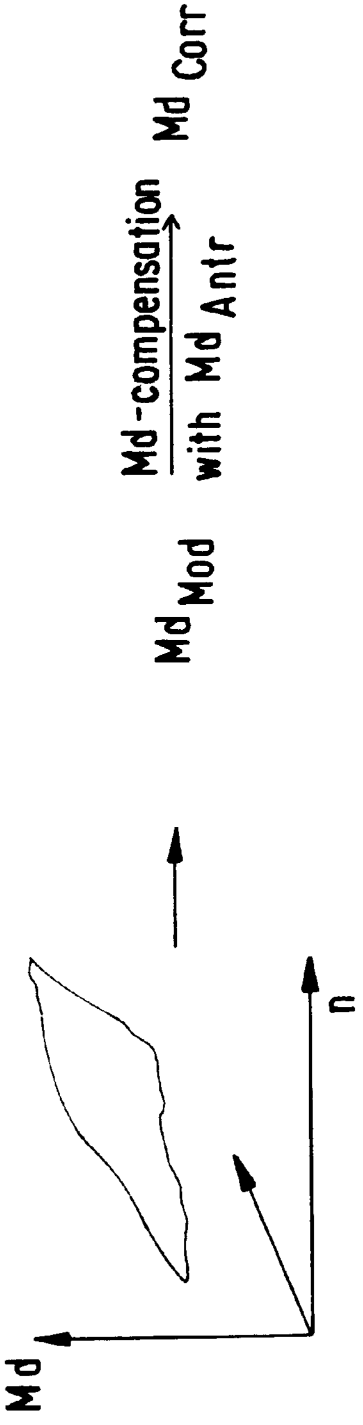
FIG. 2 illustrates a method for moment adaptation according to the present invention.

According to the diagram of FIG. 2, it can be seen that initially an engine moment $Md_{Mod}$ is determined from a model. This engine moment is read from a program map (typically stored in the control unit memory), in which the moment is plotted against the engine speed n and the load. The engine moment $Md_{Mod}$ thus determined is then corrected through a balancing of moments by using the signal $Md_{Antr}$, which results peripherally in a corrected model moment $Md_{Corr}$ in the aforementioned controllers 22, 24 and 26. The corrected model $Md_{Corr}$ exhibits a significantly reduced deviation from the actual engine moment than has been the case up to now.

Altogether, the engine moment can be adjusted in an adaptive fashion to the actual moment and can be determined very accurately with the methods described above.

As will be readily understood by those of skill in the art, the processing of the moment signal $Md_{Antr}$ in conjunction with the moment model $Md_{Mod}$ can be carried out using software, hardware or a combination of both, such as by microprocessor based control units.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An engine moment determining device based on an engine moment model, comprising:

at least one computation unit which determines an engine moment based on the existing engine moment model from at least one of vehicle performance characteristics and sensor input parameters;

a transmission output shaft moment sensor arranged between a clutch of a vehicle engine and driven wheels of the vehicle, said sensor outputting a signal to said computation unit corresponding to a moment in the output shaft; and wherein said computation unit corrects the engine moment model based on the output shaft moment signal.

2. The engine moment determining device according to claim 1, wherein the sensor is located on one of a transmission drive shaft of the clutch and a cardan shaft.

3. The engine moment determine device according to claim 1, wherein the sensor is designed so that the sensor signal is captured with zero contact.

4. The engine moment determining device according to claim 2, wherein the sensor is designed so that the sensor signal is captured with zero contact.

5. The engine moment determining device according to claim 1, wherein a strain gauge is used on the transmission drive shaft as part of the sensor.

6. The engine moment determining device according to claim 2, wherein a strain gauge is used on the transmission drive shaft as part of the sensor.

7. The engine moment determining device according to claim 3, wherein a strain gauge is used on the transmission drive shaft as part of the sensor.

8. An engine moment determining device based on an engine moment model, comprising:

at least one computation unit which determines an engine moment based on the engine moment model from at least one of vehicle performance characteristics and sensor input parameters;

a transmission output shaft moment sensor arranged between a clutch of a vehicle engine and driven wheels of the vehicle, said sensor outputting a signal to said computation unit corresponding to a moment in the drive shaft; and wherein said computation unit corrects the engine moment model based on the drive shaft moment signal;

wherein an output of said computation unit provides a corrected moment to a transmission controller.

9. A method for accurately determining an engine moment of a vehicle, the method comprising the acts of:

determining a first existing engine moment based on an engine moment model from at least one of performance characteristics and sensor input parameters of the vehicle;

sensing a transmission drive shaft moment at a location between a clutch and driven wheels of the vehicle; and computing a corrected engine moment based on the first existing engine moment as a function of the sensed transmission drive shaft moment.

10. The method according to claim 9, wherein the act of sensing is performed in a contactless manner.

11. The method according to claim 9, wherein the act of sensing is performed by sensing loads upon a strain gauge arranged on the transmission drive shaft of the clutch or a cardan shaft.

12. A method for accurately determining an engine moment of a vehicle, the method comprising the acts of:

determining a first engine moment based on an engine moment model from at least one of performance characteristics and sensor input parameters of the vehicle;

sensing a transmission drive shaft moment at a location between a clutch and driven wheels of the vehicle; and computing a corrected engine moment based on the first engine moment as a function of the sensed transmission drive shaft moment;

wherein the step of computing a corrected engine moment includes the step of outputting said corrected moment to a transmission control unit.

13. A software product comprising a computer readable medium having stored thereon program code segments that:

determine a first existing engine moment based on an engine moment model from at least one of performance characteristics and sensor input parameters of the vehicle;

determine a transmission drive shaft moment at a location between a clutch and driven wheels of the vehicle from a sensor signal; and compute a corrected engine moment based on the first existing engine moment as a function of the determined transmission drive shaft moment.

14. A software product comprising a computer readable medium having stored thereon program code segments that:

determine a first engine moment based on an engine moment model from at least one of performance characteristics and sensor input parameters of the vehicle;

determine a transmission drive shaft moment at a location between a clutch and driven wheels of the vehicle from a sensor signal; and compute a corrected engine moment based on the first engine moment as a function of the determined transmission drive shaft moment;

further including a program code segment for outputting said corrected engine moment to a transmission control unit.

* * * * *